May 19, 1925.

W. L. MITCHELL 1,538,297

PROTECTING SHIELD FOR USE IN SHIPPING AUTOMOBILES

Filed Dec. 30, 1924

INVENTOR
William Ledyard Mitchell
BY
ATTORNEY

Patented May 19, 1925.

1,538,297

UNITED STATES PATENT OFFICE.

WILLIAM LEDYARD MITCHELL, OF GROSSEPOINTE FARMS, MICHIGAN.

PROTECTING SHIELD FOR USE IN SHIPPING AUTOMOBILES.

Application filed December 30, 1924. Serial No. 758,958.

*To all whom it may concern:*

Be it known that I, WILLIAM LEDYARD MITCHELL, a citizen of the United States, residing at Grossepointe Farms, in the county of Wayne and State of Michigan, have invented certain new and useful Improvements in Protecting Shields for use in Shipping Automobiles, of which the following is a specification, reference being had to the accompanying drawings.

My invention relates to protecting shields and more particularly to a specially prepared shroud used when shipping decked automobiles.

It is a well known fact that all new automobiles are well oiled and greased and that as a general rule oils, water, gasoline and other liquids drip therefrom when the same are shipped. Therefore, the primary object of my invention is to provide a shield to be placed underneath automobiles in decked and half-decked shipments which protects the car below from being damaged by foreign matter.

Another object is to include with such a device, a shield under each wheel to prevent liquid from fluid brakes, such as are sometimes used on automobiles, dripping upon the lower automobile.

Further objects of my invention are to provide a shield that is cheap and economical to build; that can be used on a number of occasions and that can be easily installed.

Figure 1:
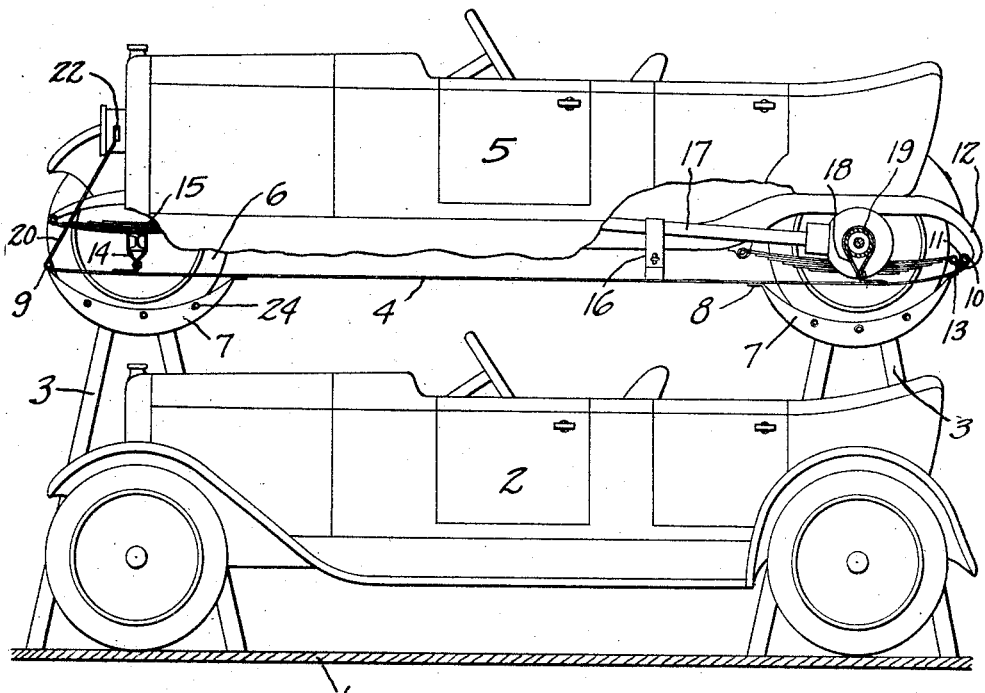

With these and other objects in view, my invention consists in the arrangement, combination and construction of the various parts of my improved device as described in the specification, claimed in my claims and shown in the accompanying drawings, in which:

Fig. 1 is a front elevation of two cars ready for shipment with my improved device placed between them.

Figure 2:
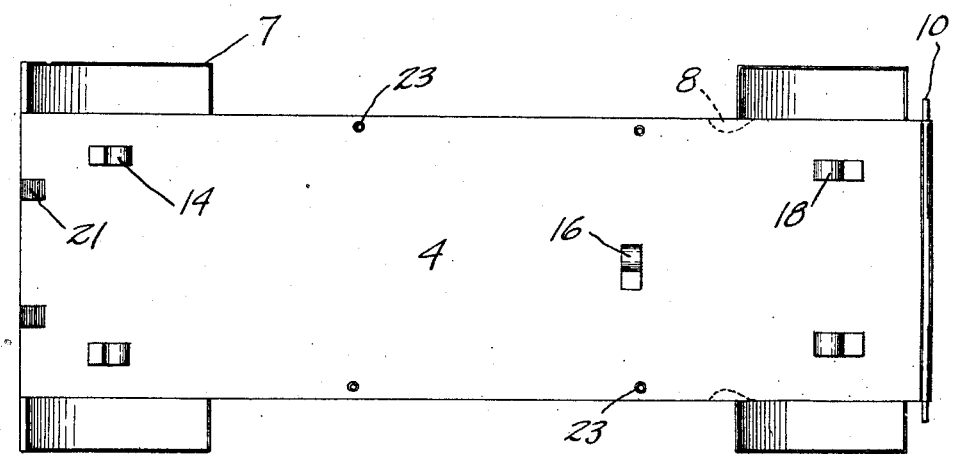

Fig. 2 a top view of my improved device.

Referring more particularly to the drawings, 1 represents the platform of the carrier upon which is placed an automobile 2 and over the said automobile 2, mounted upon decking 3, extending up from the platform 1, is an automobile 5.

A large canvass covering 4, preferably paraffine dipped, is placed under the automobile 5, so that the wheels 6 thereof will set in the bags or pockets 7, which are securely fastened to the sides of the cover 4 by stitching and by the reinforced leather strips 8 at the corners thereof.

Bars or pipes 9 and 10 are placed on the front and rear ends respectively of the cover 4. The said bar 10 is adapted to hang in the space 11 formed by part of the frame 12 and the spring shackle 13.

The cover 4 is firmly attached to the automobile 5 by the straps 14 that fasten around the front axle housing 15, the strap 16 that fastens around the propeller shaft 17, the straps 18 that fasten around the rear axle housing 19 and front straps 20 that are mounted on the canvas 4 at 21 and fasten around some part of the front of the said automobile 5 as the lamp bracket 22.

Grommets 23 are arranged in the center of and near the edges of the cover 4 and grommets 24 are provided around the edges of the wheel pockets 7. Thus in the practical use of my improved device it readily can be seen that the pockets 7 which are securely fastened to the wheels 6 by the use of the grommets 24, catch all the liquids falling from the brakes, that the pipes 9 and 10 prevent the oil or other liquids from running over the front and rear ends, and, finally, that means may be placed in the grommets 23 of the cover 4 so that when the same are fastened, a trough effect will be produced, terminating at the center line, thus making it impossible for liquids to drip over the edges.

I desire it to be understood that my invention is equally applicable to the shipping of "half decked" automobiles, that is to say, automobiles which are positioned only partly over another automobile, and my claims wherein they refer to one automobile over the other, are intended to cover such an arrangement.

It is obvious that various changes may be made in the arrangement, combination and construction of the various parts of my improved device without departing from the spirit of my invention, and it is my intention to cover by my claims such changes as may be reasonably included within the scope thereof.

What I claim is:

1. A device for use in shipping automobiles, wherein one automobile is placed over another, consisting of a canvas disposed between the two automobiles and pockets in said canvas adapted to receive the wheels of the top automobile whereby liquids dripping from the top automobile or the wheels thereof may be collected and the bottom automobile protected.

2. A device for use in shipping automobiles wherein one automobile is placed over another, consisting of a canvas disposed between the two automobiles, rods in the ends of said canvas and means securing said rods and canvas to one of said automobiles.

3. A device for use in shipping automobiles wherein one automobile is placed over another, consisting of a canvas disposed between the two automobiles, rods in the ends of said canvas and means consisting of straps on said canvas at spaced points thereon for securing said rods and canvas to one of said automobiles.

4. A device for use in shipping automobiles wherein one automobile is placed over another, consisting of a canvas disposed between the two automobiles and secured to one of them, said canvas has a rod extending transversely thereof at one end, one of said automobiles having a partially closed space adjacent one end thereof and said rod being disposed in said space to prevent movement of the rod or canvas in at least one direction.

WILLIAM LEDYARD MITCHELL.